US009589190B2

United States Patent
Ramakrishnan et al.

(10) Patent No.: US 9,589,190 B2
(45) Date of Patent: Mar. 7, 2017

(54) SYSTEM AND METHOD FOR DETECTION OF HIGH-INTEREST EVENTS IN VIDEO DATA

(71) Applicant: Robert Bosch GmbH, Stuttgart (DE)

(72) Inventors: Naveen Ramakrishnan, Wexford, PA (US); Iftekhar Naim, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 1084 days.

(21) Appl. No.: 13/724,389

(22) Filed: Dec. 21, 2012

(65) Prior Publication Data

US 2014/0176708 A1   Jun. 26, 2014

(51) Int. Cl.
H04N 7/18     (2006.01)
H04N 9/47     (2006.01)
G06K 9/00     (2006.01)
G06K 9/62     (2006.01)

(52) U.S. Cl.
CPC ......... *G06K 9/00771* (2013.01); *G06K 9/624* (2013.01)

(58) Field of Classification Search
USPC ........................................ 348/143
See application file for complete search history.

(56) References Cited

U.S. PATENT DOCUMENTS

| 7,639,840 | B2 | 12/2009 | Hanna et al. |
| 8,009,193 | B2 | 8/2011 | Zhou et al. |
| 8,131,012 | B2 | 3/2012 | Eaton et al. |
| 8,189,905 | B2 | 5/2012 | Eaton et al. |
| 2005/0180637 | A1 | 8/2005 | Ikeda et al. |
| 2005/0286774 | A1* | 12/2005 | Porikli ............... G06K 9/00335 382/225 |
| 2006/0222205 | A1* | 10/2006 | Porikli ..................... G06K 9/32 382/103 |
| 2008/0240579 | A1 | 10/2008 | Enomoto |
| 2009/0016599 | A1 | 1/2009 | Eaton et al. |
| 2009/0016600 | A1 | 1/2009 | Eaton et al. |

(Continued)

FOREIGN PATENT DOCUMENTS

WO    2010111748 A1    10/2010

OTHER PUBLICATIONS

Lee et al. (Lee, Honglak, et al. "Efficient sparse coding algorithms." Advances in neural information processing systems (NIPS) 19, Proceedings of the 2006 Conference, Published on: Sep. 7, 2007, pp. 801-808).*

(Continued)

*Primary Examiner* — Christopher S Kelley
*Assistant Examiner* — Ana Picon-Feliciano
(74) *Attorney, Agent, or Firm* — Maginot, Moore & Beck LLP

(57) ABSTRACT

A method for event identification in video data includes identifying a feature vector having data corresponding to at least one of a position and a direction of movement of an object in video data, generating an estimated feature vector corresponding to the feature vector using a dictionary including a plurality of basis vectors, identifying an error between the estimated feature vector and the feature vector, identifying a high-interest event in the video data in response to the identified error exceeding a threshold, and displaying the video data including the high-interest event on a video output device only in response to the error exceeding the threshold.

24 Claims, 8 Drawing Sheets

(56) References Cited

U.S. PATENT DOCUMENTS

| | | |
|---|---|---|
| 2009/0222388 A1 | 9/2009 | Hua et al. |
| 2009/0319560 A1 | 12/2009 | Cheng et al. |
| 2010/0061624 A1 | 3/2010 | Cobb et al. |
| 2010/0260376 A1* | 10/2010 | Cobb ................. G06K 9/00785 382/103 |
| 2011/0128374 A1 | 6/2011 | Shellshear et al. |
| 2011/0314367 A1 | 12/2011 | Chang et al. |
| 2013/0286208 A1* | 10/2013 | Bala ................... G06K 9/00771 348/149 |

OTHER PUBLICATIONS

International Search Report and Written Opinion corresponding to PCT Application No. PCT/US2013/077337, mailed Apr. 2, 2014 (9 pages).

Lee et al., "Efficient sparse coding algorithms," Advances in Neural Information Processing Systems (NIPS) 19, 2007 (8 pages).

Zhao et al., "Online Detection of Unusual Events in Videos via Dynamic Sparse Coding," IEEE Conference on Computer Vision and Pattern Recognition, Jun. 20, 2011 (8 pages).

Griffiths et al., "Infinite Latent Feature Models and the Indian Buffet Process," Gatsby Computational Neuroscience Unit, University College London, 2005 (26 pages).

\* cited by examiner

SYSTEM AND METHOD FOR DETECTION OF HIGH-INTEREST EVENTS IN VIDEO DATA

TECHNICAL FIELD

This disclosure relates generally to the field of video monitoring, and, more particularly, to systems and methods for identifying high-interest events in video data that also include low-interest events.

BACKGROUND

Video monitoring systems are widely deployed for various purposes, which include security and public safety. In a typical video monitoring system, one or more cameras are deployed in different locations to monitor activities. For example, video monitoring systems generate images of public places, transportation facilities, retail stores, industrial facilities, and residences and other private property. The monitoring systems often include data storage devices that archive some or all of the recorded video for later review, and one or more video output devices that enable playback of live and archived video data.

In some monitoring systems, the cameras generate video data that are monitored by one or more human operators who can view activity in the video and take appropriate action if they view an incident. For example, in a monitoring system at a retail store, the operator views live video of individuals in the store and alerts security personal if an individual attempts to shoplift merchandise. In another example, operators monitor the video feeds from traffic cameras that monitor busy sections of highways to spot traffic accidents or traffic congestion. The operators contact emergency response personnel if an accident occurs and then they broadcast traffic alerts to inform other drivers in the heavy traffic sections.

More broadly, the operators that monitor the video monitoring systems typically take an action when the recorded video depicts a "high-interest event." As described above, the precise nature of a high-interest event varies between different contexts and the mission of the operators using the video monitoring system. As used herein, the term "high-interest event" refers to any event in the recorded video data that prompts an operator of the video monitoring system to take an action. Actions include, but are not limited to, contacting other personnel with information based on an event that is depicted in the video, reviewing additional archived video footage prior to the event occurring, or monitoring a subject in the video after the event occurs more closely to track the activity of the subject.

In addition to high-interest events, the video data typically contain "low-interest events." As used herein, the term "low-interest event" refers to any event or lack of event that does not prompt the operator to take an action. For example, in the traffic monitoring system described above, a car driving along a road as part of a routine traffic flow is a low-interest event. In a retail store video monitoring system, an empty aisle with no activity is another low-interest event. The video data generated in many video monitoring systems includes predominantly low-interest events with more occasional high-interest events being intermingled with the low-interest events in an unpredictable fashion.

While video monitoring systems are used in a wide range of applications, the human operators that operate the systems often miss high-interest events. In some instances, the video monitoring system collects too much video for a limited number of human operators to review effectively. Additionally, as the human operators review video with only low-interest events occurring for a prolonged time, the human operators lose the ability to focus on the video and can fail to recognize high-interest events. Consequently, improvements to video monitoring systems that enable operators to identify a greater proportion of high-interest events that are recorded in the video data would be beneficial.

SUMMARY

In one embodiment, a method of monitoring video data has been developed. The method includes identifying a feature vector of an event having data corresponding to at least one of a position and a direction of movement of an object in video data, generating an estimated feature vector corresponding to the feature vector using a dictionary that includes a plurality of basis vectors, identifying an error between the estimated feature vector and the identified feature vector, identifying a high-interest event in the video data in response to the identified error exceeding a threshold, displaying the video data that includes the high-interest event on a video output device only in response to the identified error exceeding the threshold.

In another embodiment, a video monitoring system has been developed. The system includes a camera configured to generate video data of events, each event including an object in the video data, a video output device configured to display portions of the video data generated by the camera, and a processor operatively connected to the camera, the video output device, and a memory. The processor is configured to identify a feature vector of an event comprising data corresponding to at least one of a position and a direction of movement of an object in video data received from the camera, generate an estimated feature vector corresponding to the feature vector using a dictionary stored in the memory that includes a plurality of basis vectors, identify an error between the estimated feature vector and the feature vector, identify a high-interest event in the video data in response to the identified error exceeding a threshold, and display the video data that includes the high-interest event on the video output device only in response to the identified error exceeding the threshold.

DETAILED DESCRIPTION

Figure 1:
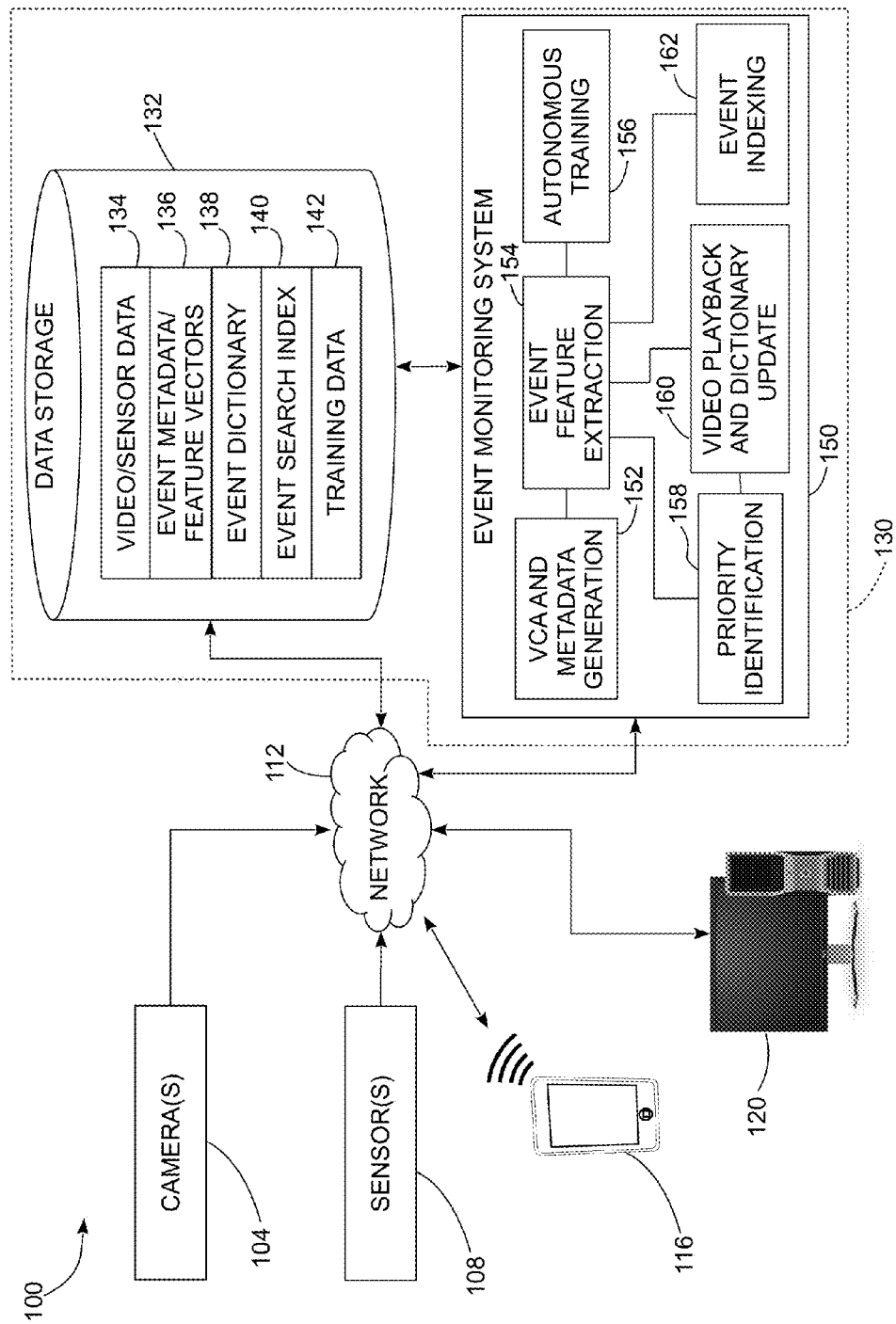
FIG. 1 is a schematic diagram of a video monitoring system.

For the purposes of promoting an understanding of the principles of the embodiments described herein, reference is now being made to the drawings and descriptions in the following written specification. No limitation to the scope of the subject matter is intended by the references. The description also includes any alterations and modifications to the illustrated embodiments and includes further applications of the principles of the described embodiments as would normally occur to one skilled in the art to which this document pertains.

As used herein, the term "sparse encoding" refers to a method for generating data corresponding to a large number of inputs that are encoded as vectors using a plurality of "basis vectors" and "sparse weight vectors." The basis vectors are generated using a penalized optimization process applied to a plurality of predetermined input vectors that are provided during a training process. In one embodiment, a $l_1$ optimization process that is known to the art is used to generate the basis vectors and sparse weight vectors that correspond to a plurality of input training vectors. The term "sparse" used to refer to a vector or matrix describes a vector or matrix having a plurality of elements where a majority of the elements are assigned a value of zero. As used herein, the term "dimensionality" as applied to a vector refers to a number of elements in the vector. For example, a row or column vector with three elements is said to have a dimensionality of three, and another row or column vector with four elements is said to have a dimensionality of four.

As used herein, the term "dictionary" refers to a plurality of basis vectors that are generated using the sparse encoding process. After the dictionary is generated during the training process, the basis vectors in the dictionary are used to identify a degree of similarity between an arbitrary input vector and the input vectors that were used to generate the basis vectors in the dictionary during the training process. An optimization technique is used to select combinations of basis vectors using a sparse weight vector to generate a reconstructed vector that estimates the arbitrary input vector. An identified error between the reconstructed estimate vector and the actual input vector provides a measure of similarity between the input vector and the dictionary.

As used herein, the term "metadata" refers to properties of objects that are identified in video or other sensor data. For example, if an object follows a path through a field of view of a video camera, the metadata corresponding to the object include the two-dimensional position of the object in the frames of video data, a velocity of the object, a direction of movement of the object, a size of the object, and a duration of time that the object is present in the field of view of the camera. As described below, events are identified with reference to the observed metadata of an object. The metadata do not require that an object be identified with particularity. In one embodiment, the metadata do not identify that an object is a particular person, or even a human being. Alternative embodiments, however, infer that metadata correspond to a human if the event is similar to an expected human action, such metadata of an object moving at a direction and speed that correspond to a human walking past a camera. Additionally, individual objects are only tracked for a short time and the metadata do not identify the same object over prolonged time periods. Thus, the stored metadata and identification of high-interest events due to metadata do not require the collection and storage of Personally Identifiable Information (PII) beyond storage of video data footage for later retrieval.

FIG. 1 depicts a video monitoring system 100 that is configured to record video and sensor data about objects in a scene and to display selected video for additional analysis and feedback from human operators. The video monitoring system 100 includes one or more video cameras 104, optional non-camera sensors 108, an interactive monitoring terminal 120, a mobile electronic device 116, a video processing and analysis system 130. In FIG. 1, the cameras 104, sensors 108, mobile electronic device 116, monitoring terminal 120, and analysis system 130 communicate via a data network 112, such as one or more local area networks (LANs) and wide area networks (WANs).

In the system 100, the cameras 104 include any monochrome, color, multi-spectral or hyper-spectral imaging devices that produce video data that depict movement of objects within a scene. As is known in the art, the cameras 104 generate the video data as a series of images that are generated at regular intervals. Each image is referred to as a "frame" and individual frames are recorded and displayed in temporal order to depict the motion of objects in the field of view of the camera. In some embodiments, the cameras 104 include light intensifiers or infrared sensors for detection of moving objects in low-light conditions. For example, a near-infrared charged coupled device (CCD) or complementary metal oxide semiconductor (CMOS) sensor detects energy in the near-infrared band that is typically invisible to the unaided human eye.

In some embodiments, each camera 104 includes hardware and software to perform digital signal processing and encoding on the image data. For example, the cameras 104 apply filters to the image data and encode the image data in a compressed format, such as MPEG-2 or H.264, before sending the video data to the analysis system 130. In one embodiment, the cameras 104 are affixed to motorized mounts that enable the cameras to pan and tilt to view a wider region around the camera, while in another embodiment the cameras are mounted with a fixed viewing angle. In some embodiments, the cameras include adjustable zoom lenses that enable adjustment of the level of zoom in recorded video.

In the embodiment of FIG. 1, the video monitoring system 100 includes optional non-video sensors 108. The non-video sensors include a wide range of sensing devices other than traditional cameras. Examples of the sensors 108 include, but are not limited to, motion sensors, proximity sensors, temperature sensors, acoustic sensors, and range finding sensors. As described below, the video monitoring system 100 identifies events based on metadata associated with objects that are monitored using the cameras 104 and sensors 108. The metadata are generated from recorded video, and from data received from the sensors 108. The data from multiple cameras and sensors are correlated temporally and spatially to enable the video monitoring system 100 to identify metadata about detected objects using multiple sensing devices.

In the video monitoring system 100, the interactive monitoring terminal 120 and mobile electronic device 116 enable one or more human operators to review recorded video footage and to tune the video monitoring system 100 to improve the identification of high-interest events. Both the mobile electronic device 116 and monitoring terminal 120 include at least one video output device, such as an LCD screen, that displays selected segments of video data that are recorded by the cameras 104. The mobile electronic device 116 and monitoring terminal 120 also output data collected by the sensors 108.

During operation, the mobile electronic device 116 and monitoring terminal 120 receive limited sets of video data that the analysis system 130 identifies as corresponding to high-interest events. In the system 100, the mobile electronic device 116 is a tablet, smartphone, or other portable electronic device that sends and receives data using a wireless data connection to the network 112. In one embodiment, security guards or other personnel carry the mobile electronic device 116 and review recorded video of high-interest events while traveling to the location of the events. The monitoring terminal 120 is typically a personal computer (PC) or other interactive electronic device that enables a human operator to review events recorded in the video data. The human operators of the mobile electronic device 116 and monitoring terminal 120 review the video and identify whether the events depicted in the video actually correspond to high-interest events. The human operators provide feedback to the analysis system 130 that increases the accuracy of identifying high-interest events in the video data while reducing the occurrences of false-positive events that are not actually high-interest events. The monitoring system 100 also provides search capabilities for the human operators to review recorded video of an event and of other similar events using the mobile electronic device 116 and monitoring terminal 120.

The analysis system 130 includes a data storage system 132 and event monitoring system 150. The data storage system 132 is referred to as a form of memory since the data storage system 132 stores digital data for later retrieval in the video monitoring system 100. The data storage system 132 includes one or more digital data storage devices, such as arrays of magnetic disc drives, solid-state storage devices, random access memory (RAM), and the like. In the video monitoring system 100, the video cameras 104 and sensors 108 send recorded data through the network 112 to the analysis system 130 for storage as video and sensor data 134 in the data storage system 132. The data storage system 132 also stores metadata and feature vectors 136 that are generated for objects in events depicted in the video and sensor data 134. Data storage system 132 stores the event dictionary 138, which includes the dictionary generated from a sparse encoding of training data and an event search index 140 that indexes similar events for efficient searching. The data storage system 132 organizes the data using, for example, a relational database that stores relationships between the video and sensor data 134, the identified event metadata and feature vectors 136, and the search index of similar events 140. Alternative embodiments store the data using key-value data stores, hierarchical data structures, and other suitable formats for efficient storage and retrieval of the digital data.

In the analysis system 130, the event monitoring system 150 is a processor that includes multiple hardware and software modules. The event monitoring system 150 identifies metadata corresponding to events in video and sensor data, extracts features of the metadata corresponding to the events, identifies whether the extracted features are similar or dissimilar to features that are used to generate the dictionary, and alerts human operators of the mobile electronic device 116 and monitoring terminal 120 when a high-interest event is identified. In one embodiment, the event monitoring system 150 is formed from a computer cluster that includes a plurality of central processing unit (CPU) and graphics processing unit (GPU) cores that analyze the video data. In one embodiment, the cluster includes multiple independent computing devices, which are referred to as "nodes," that communicate with each other using a network such as local area network (LAN) or a wide area network (WAN). In one embodiment, all or a portion of the compute nodes are provisioned and accessed dynamically through an external service provider in a so-called "cloud" configuration. Some embodiments of the event monitoring system 150 optionally include additional signal processing and computational devices including digital signal processors (DSPs), field programmable gate arrays (FPGAs), and application specific integrated circuits (ASICs). The event monitoring system 150 includes data storage devices that hold stored programmed instructions for execution by the CPU and GPU cores, and the event monitoring system 150 is communicatively coupled to the data storage system 132 for access to the video and sensor data 134, event metadata 136, event dictionary 138, and event search index 140. The event monitoring system 150 includes a video content analysis (VCA) and metadata generation module 152, event feature extraction module 154, autonomous training module 156, priority identification module 158, video playback and dictionary update module 160, and an event indexing module 162.

In the event monitoring system 150, the VCA module 152 applies video content analysis to the video data 134 that are received from the cameras 104. The VCA module 152 generates metadata corresponding to objects that are identified in the video data. In embodiments that include data generated from multiple cameras, the VCA module 152 is configured to identify corresponding segments of video data that track the behavior of objects as the objects move between the fields of view of the multiple cameras. In the embodiment of the event monitoring system 150, the VCA module 152 generates the metadata in the form of histograms corresponding to the position, velocity, direction of movement, and size. The metadata further include the duration corresponding to how long the object is present in the video data. In some configurations, the analysis system 130 uses all of the metadata identified for each object or only some of the selected metadata that are identified for each object to identify events in the video data.

The position histogram is generated with reference to a two-dimensional location of the identified object in each frame of the video data. As the object moves, the coordinates in different frames of the video data change as the object moves along a trajectory. In one embodiment, the analysis system 130 generates a histogram over a joint two-dimensional position distribution of the object. The two-dimensional histogram is converted to a one-dimensional feature vector by stacking each of the columns in the two-dimensional histogram data. In another embodiment, the analysis system 130 generates independent histograms for each dimension (e.g., x and y dimensions) of the image data, and the histograms are concatenated to generate a single position feature vector. While the position histogram is described with reference to two dimensions, alternative embodiments identify the position of an object in three dimensions. For example, stereoscopic cameras can generate three-dimensional video data, or an external sensor, such as a laser range finder, identifies the distance between objects and the camera as the camera records the object. As described above, if additional sensors provide data corresponding to the velocity of the object in three-dimensional space, then the analysis system 130 optionally generates the feature vector from a three-dimensional histogram or three individual one-dimensional histograms that correspond to the velocity of the object.

The velocity histogram includes data corresponding to both a rate of movement and a direction of movement of the object in the video data. For example, the velocity of an object includes components corresponding to rate and direction of movement of the object along an x-axis and a y-axis in the video data. The analysis system 130 generates a velocity feature vector from either a two-dimensional velocity histogram or a combination of one-dimensional velocity histograms in a similar manner to the position histogram described above.

The direction histogram includes the occurrences of the direction of movement for the object in the video data. In one embodiment, the direction of movement is identified along a set of eight cardinal directions that are arranged at 45° angles from each other in the two-dimensional video data frames. The direction of movement histogram includes eight distinct bins for each direction of movement and the number of times that the object moves in each direction in the video data.

The size of an object in the image data can change over time due to either an actual change in the size of the object or due to the object moving toward or away from the camera in the video data. In one configuration, the analysis system 130 generates a size histogram corresponding to how often each size of the object is observed in the video data. In one embodiment the size histogram is a one-dimensional histogram corresponding to the area of each image frame that the object occupies, and in another embodiment a two-dimensional histogram is generated including a dimension of the object along both the x and y axes in the image data.

The duration metadata indicates a length of time that the object is observed in the video data. Unlike the other metadata elements described above, the duration is not a histogram but simply a numeric value, such as a timestamp or number of frames of video data, corresponding to how long the object is observed in the video. As described above, objects are identified while in the video data, but are not uniquely identified. For example, if a single object enters the field of view of the cameras 104, exits the field of view, and then reappears in the field of view at a later time, then the analysis system 130 does not directly link the identity of the object between the two sets of video data that depict the object. Instead, the analysis system 130 identifies the behavior of the object as two separate events and identifies the metadata corresponding to either a single object, multiple objects that interact with each other, and metadata corresponding to a type of object such as a person, vehicle, package, or other object.

In the event monitoring system 150, the feature event extraction module 154 generates a feature vector for each event that the VCA module 152 identifies using the metadata corresponding to the event. Each feature vector is a fixed-dimensionality numeric vector in which each entry in the feature vector corresponds to at least one piece of metadata for the identified event. While the feature vector for each event is a fixed-dimensionality vector, different events often have widely varying metadata characteristics. For example, an object that moves past the cameras while starting, stopping, and changing direction has a much different trajectory than another object that moves through the scene at a constant velocity. The event feature extraction module normalizes the feature vectors that are generated from the different metadata for both generation of the dictionary during a training process and for identification of high-interest and low-interest events in monitored video and sensor data.

In the event monitoring system 150, the autonomous training module 156 generates the basis vectors in an event dictionary 138 using a plurality of feature vectors that are generated from selected metadata identified in video and sensor data. The feature vectors that are used to generate the basis vectors in the event dictionary 138 are referred to as "training data." The video and sensor data that are used for training are selected to include a large number of common low-interest events. For example, if the video cameras 104 and sensors 108 in the system 100 monitor a hallway with pedestrian traffic, then the selected training data include recordings of common pedestrian traffic through the hallway. The training data can include a small number of high-interest events, but the number of high-interest events is typically much lower than the number of low-interest events. As described in more detail below, the autonomous training module 156 generates the event dictionary 138 autonomously, which is to say without human interaction, and the event dictionary 138 includes basis vectors and the sparse weight vector that generate estimates of the low-interest events with the greatest accuracy.

FIG. 1 illustrates an embodiment of the event monitoring system 150 that stores event dictionary data 138 for one or more dictionaries in the data storage system 132. In one embodiment, multiple dictionaries are generated based on temporal or spatial variations in large sets of video data. For example, in one embodiment the video monitoring system 100 monitors the entrance to an office building and the event dictionary data 138 include two event dictionaries. One event dictionary corresponds to regular business hours and the dictionary is generated from metadata feature vectors that correspond to video and sensor data collected during business hours. The second dictionary corresponds to the evening and early morning hours outside of normal business hours. An event that is classified as a low-interest event during the normal business day can be classified as high-interest if the event occurs outside of normal business hours, and the two dictionaries enable the same event to be classified differently based on the time at which the event occurs. In one embodiment, the analysis system 130 automatically selects an event dictionary from the event dictionary data 138 to use in classifying the interest level of an event based on a timestamp corresponding to the time the event was observed in the video and sensor data 134. Alternative embodiments include additional event dictionaries that correspond to different time ranges including event dictionaries that correspond to particular days of the week, event dictionaries that correspond to holidays, and event dictionaries that correspond to recurring events such as sporting events and concerts held at an arena. In other embodiments, the event dictionary data 138 include multiple event dictionaries that correspond to different locations where different types of event activity occur during operation of the system 100.

In some configurations, the feature event extraction module 154 uses only a portion of the different types of metadata described above to generate the feature vector for each event. For example, in one embodiment the event feature extraction module 154 generates feature vectors from only the position and direction of movement histograms. In another embodiment, the event feature extraction module 154 generates feature vectors from the position and velocity histograms, where the velocity histogram includes data corresponding to both the direction of movement and rate of movement of the object during the event.

During monitoring of video and sensor data, the priority identification module 158 receives feature vectors from the event feature extraction module 154 for events that are identified in the video and sensor data. The priority identification module 158 accesses the event dictionary 138 and performs a penalized optimization process using the basis vectors in the dictionary data 138 to generate an estimated feature vector of the identified feature vector for the event. If the difference between the identified feature vector and the estimated feature vector is less than a predetermined threshold, then the event corresponding to the feature vector is identified as being similar to events that are already encoded in the event dictionary and is assigned a low-priority status. If, however, the difference between the identified feature vector and the estimated feature vector exceeds the predetermined threshold, then the corresponding event is assigned a high-interest status.

In the event monitoring system 150, the video playback and dictionary update module 160 retrieves video and optionally sensor data from the video and sensor data 134 in the data storage system 132 for playback via the mobile electronic device 116 and monitoring terminal 120. The video playback module 160 displays portions of the video and sensor data 134 that correspond to high-interest events from the priority identification module 158. In some embodiments, the video playback module 160 inserts an overlay graphic or other indicia to highlight the portion of the video that includes the high-interest event. A human operator reviews the video and sensor data and takes an appropriate action or retrieves additional video footage if the identified event is a high-interest event. In some instances, the priority identification module 158 identifies a high-interest event that the human operator determines is not actually a high-interest event upon further analysis. The human operator enters an input through a graphical user interface (GUI) displayed on the mobile electronic device 116 or monitoring terminal 120 that indicates the event is a low-interest event. The video playback and dictionary update module 160 receives the signal from the mobile electronic device 116 or monitoring terminal 120 and updates the event dictionary 138 to classify future similar events as being low-interest events instead of high-interest events. In another operating mode, the video playback module 160 displays segments of video data that are identified as including only low-interest events. The human operators analyze the recorded video and if the video data include a high-interest event that is incorrectly identified as being a low-interest event, then the mobile electronic device 116 or monitoring terminal 120 sends another signal to the video playback and dictionary update module 160 to indicate that the event is actually a high-interest event. The video playback and dictionary update module 160 then deletes one or more basis vectors from the event dictionary 138 that correspond to the event so that future similar events are identified as high-interest events.

In the event monitoring system, the human operators often review similar events that are identified in the video and sensor data. The event indexing module 162 in the event monitoring system 150 receives feature vectors corresponding to each event and updates the event search index 140 to enable efficient retrieval of video and sensor data that correspond to similar events. The event indexing module 162 identifies similar events by generating sparse weight vectors using the penalized optimization process and the basis vectors in the event dictionary 138 in the same manner as the priority identification module 158. The event indexing module identifies estimated feature vectors for a plurality of events that are similar using, for example, a clustering algorithm. The event search index 140 enables human operators to retrieve video and sensor data for similar events in an efficient manner without having to review length segments of recorded video manually. The event indexing module 162 generates indexes for both low-priority and high-priority events in the recorded video and sensor data. In one embodiment, the event indexing module 162 updates the event search index 140 in a continuous manner as the event monitoring system 150 identifies new events in the video and sensor data.

While FIG. 1 depicts an exemplary embodiment of the video monitoring system 100, alternative embodiments include different combinations of hardware and software components. For example, in one alternative embodiment a single camera incorporates the event monitoring system 150 including hardware and software components that implement the VCA and metadata generation module 152, event feature extraction module 154, autonomous training module 156, and priority identification module 158. The camera stores the event dictionary for use in identifying high-interest and low-interest events in the event metadata. The camera sends video data to a PC workstation or other suitable computing device that stores the video data and provides a GUI to control the camera and to play back video of high-interest events that the camera identifies. In still another embodiment, the analysis system 130, including the data storage system 132 and the event monitoring system 150, is implemented as a software application that is executed on a PC workstation. The workstation receives image data from one or more cameras via the data network 112 and the processor in the PC workstation executes the software application to operate components in the workstation to perform the functions of the analysis system 130 and the video monitoring terminal 120.

Figure 2:
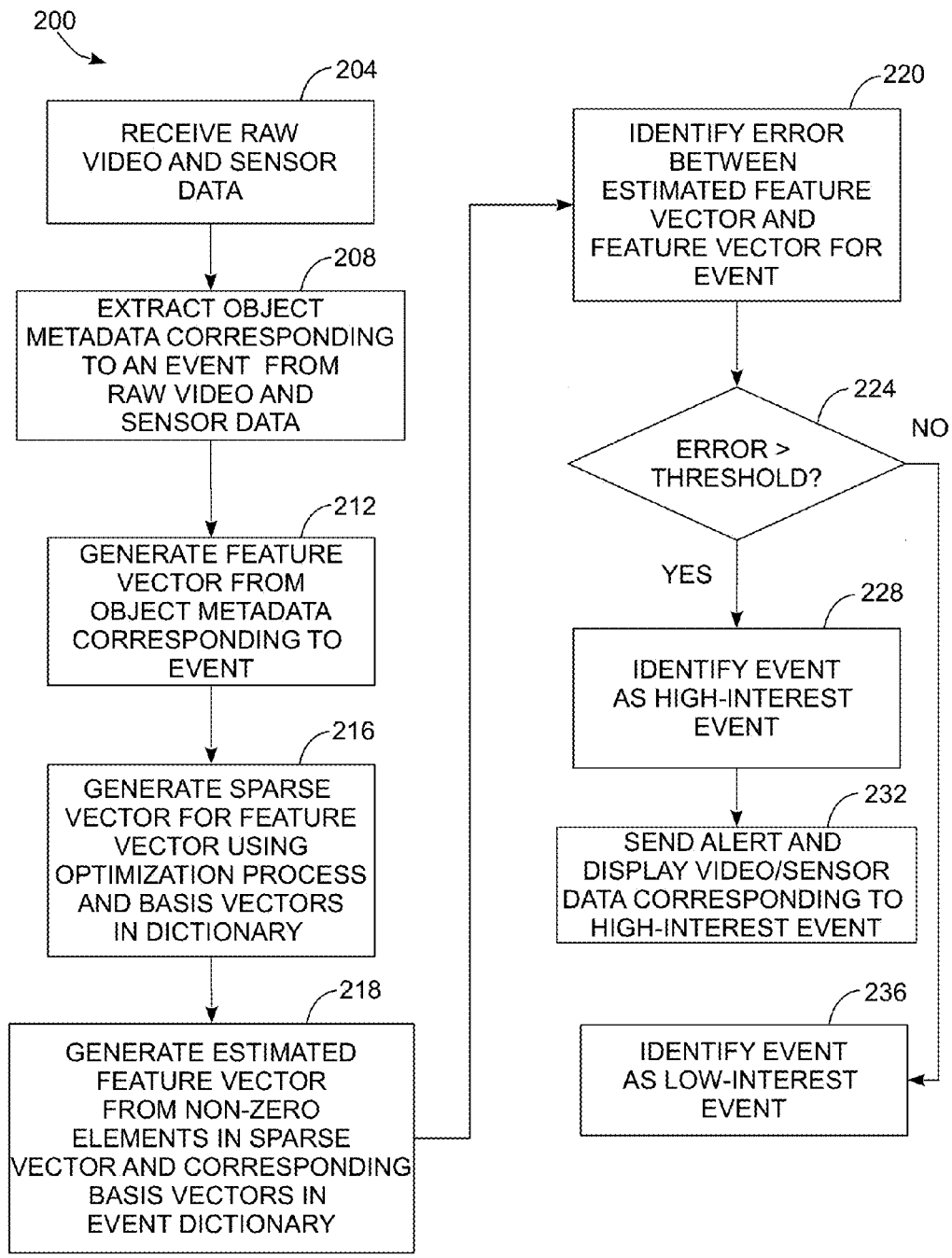
FIG. 2 is a block diagram of a process for identifying high-interest and low-interest events in a video monitoring system.

FIG. 2 depicts a process 200 for identification of high-interest events in video and sensor data. In the description below, a reference to the process 200 performing or doing some function or action refers to one or more controllers or processors that are configured with programmed instructions to implement the process performing the function or action or operating one or more components to perform the function or action. Process 200 is described with reference to the video monitoring system 100 of FIG. 1 for illustrative purposes.

Process 200 begins as the analysis system 130 receives video and sensor data from the cameras 104 and sensors 108, respectively (block 204). In the video monitoring system 100, the cameras 104 and sensors 108 stream data to the data storage system 132, which archives the video and sensor data 134 for analysis and playback. In some configurations the mobile electronic device 116 and monitoring terminal 120 view the streaming video data as a live feed in addition to the data being stored in the data storage system 132.

The video monitoring system 100 identifies events and assigns a priority to events in the video and sensor data in an "online" mode. That is to say, the video monitoring system 100 identifies events as they occur in the video and sensor data and identifies whether the feature vector generated from metadata of the events corresponds to high-interest or low-interest events. Thus, the system 100 identifies high-interest events with a comparatively small temporal delay between the occurrence of a high-interest event and the review of the high-interest event by a human operator. By contrast, a "batch" mode requires that a large amount of video data be recorded before any events can be identified. In addition to operating in the online mode, the video monitoring system 100 can operate in a batch mode to, for example, review an archive of previously recorded video data to identify high-interest events in the archived video data.

Process 200 continues as the analysis system 130 identifies events corresponding to different objects in the video and sensor data, and extracts metadata for the object during an event (block 208). In the event monitoring system 150, the VCA and metadata generation module 152 processes the video and sensor data and generates the metadata for one or more of the object position, velocity, direction of movement, size, and the duration of the event. As described above, some of the types of metadata are encoded as one- or two-dimensional histograms that are converted into one-dimensional vectors for use in generating a feature vector that describes the event.

Figure 6:
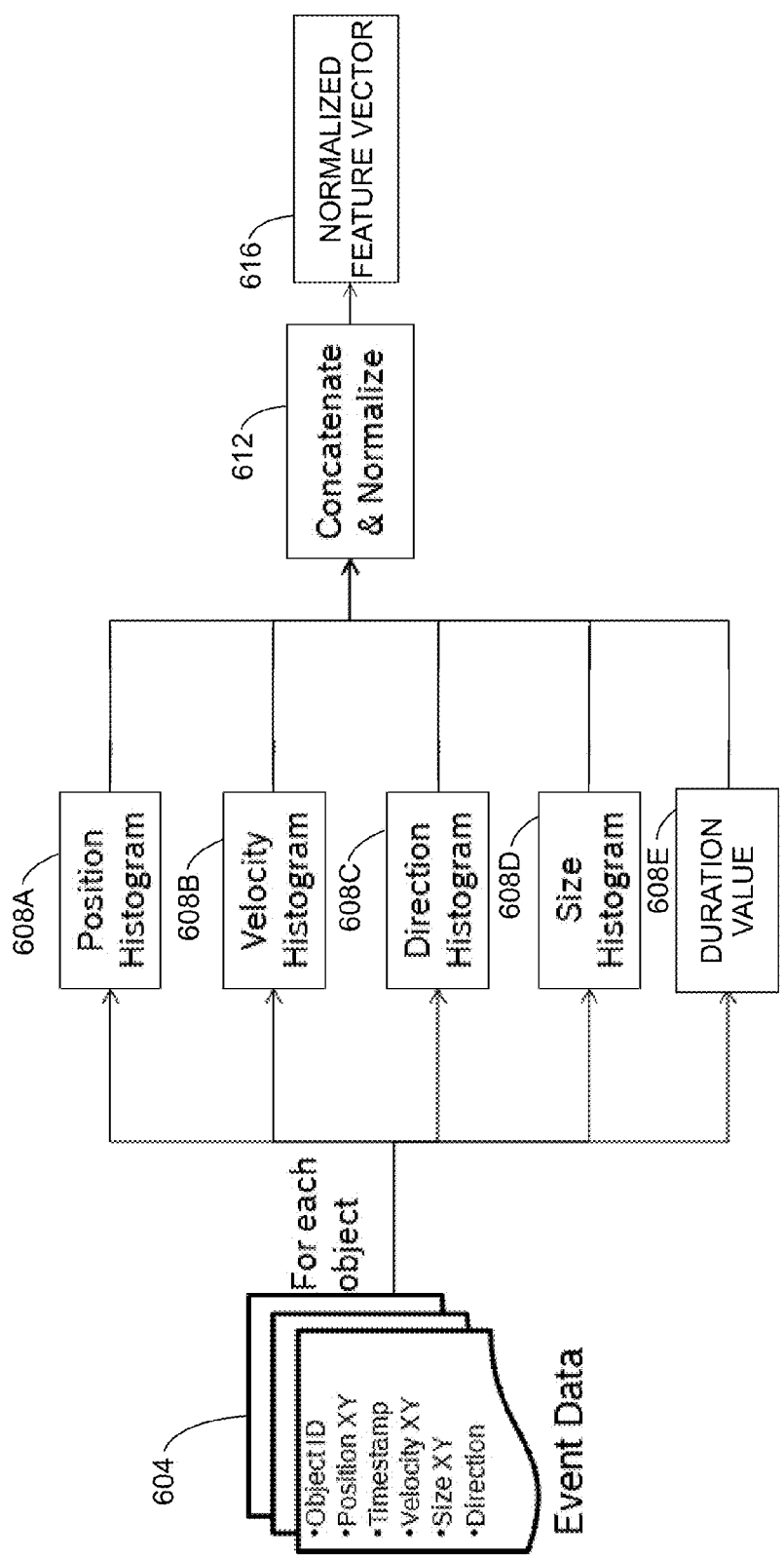
FIG. 6 is a block diagram depicting metadata that are extracted from video and sensor data and a process for generating a feature vector from multiple types of metadata.

Process 200 continues as the event feature extraction module 154 in the event monitoring system 150 generates feature vectors corresponding to the identified event from the metadata associated with the event (block 212). The event feature extraction module 154 generates the fixed-dimensionality feature data using some or all of the metadata for the event. As depicted in FIG. 6, the event data 604 include a plurality of metadata associated with individual objects and events. The metadata for each event include the position histogram 608A, velocity histogram 608C, direction of movement histogram 608C, object size histogram 608D, and a time duration value 608E. To generate a feature vector from a plurality of metadata histograms, the event feature extraction module 154 performs a concatenation and normalization operation 612 on the metadata. The concatenation process treats the histogram vectors for the metadata as fixed-dimensionality vectors and generates the feature vector as a concatenation of the histograms. For example, if the position histogram is converted into a thirty-two element vector and the direction of movement histogram is converted into an eight element vector, then the concatenated feature vector includes forty entries.

The normalization process enables generation of fixed-dimensionality feature vectors for events that have widely different time durations. During the normalization process, the event feature extraction module 154 performs one or more normalization methods such as a unit norm process. The unit norm process adjusts the elements in each set of concatenated feature vectors so that the total Euclidean sum of all the elements in each feature vector is equal to a predetermined value (e.g., 1). In one example, a feature vector for a first event includes a large number of different positions in the position histogram vector, while another feature vector for a second event includes a much smaller number of different positions because the second event has a much shorter duration than the first event. The unit norming process ensures that the total Euclidean sum of both the first and second vectors is the same, even if the individual element values in each vector are different. In one alternative embodiment, the feature vectors are normalized using a trajectory length based approach corresponding to the total number of observed metadata elements in the feature vector where each element in the vector is divided by the sum of the feature vector. In another alternative embodiment, the normalization process divides each element in the feature vector by the value of the maximum element in the feature vector. In another alternative embodiment, the feature vector elements are divided by a total number of events in the video and sensor data that correspond to a single object or group of related objects.

The event feature extraction module 154 generates the final normalized feature vector 616 corresponding to the metadata identified for the event. In some embodiments, the event feature extraction module 154 generates the concatenated and normalized feature vector 616 from only selected pieces of the metadata, such as the object position 608A and direction of movement 608C, or the object position 608A and velocity 608B. In other embodiments, all of the metadata are used. While FIG. 6 depicts illustrative examples of metadata, the feature vector can include elements from different pieces of metadata. For example, in the system 100 some embodiments of the sensors 108 generate additional metadata about objects and events, such as the temperature variation of an object or sound emitted from the object during an event. The event feature extraction module 154 concatenates and normalizes the additional metadata to form fixed-dimensionality feature vectors for each of the events.

Referring again to FIG. 2, process 200 continues as the event monitoring system 150 performs a penalized optimization process, such as an $l_1$ optimization process, to generate a sparse weight vector that corresponds to the feature vector of the event and the basis vectors that are stored in the dictionary (block 216). In the event monitoring system 150, the priority identification module 158 performs the $l_1$ optimization process to identify a small number of the basis vectors in the event dictionary with entries that are scaled through multiplication with the weight values in the sparse weight vector and then summed to generate an estimated feature vector that corresponds to the observed feature vector (block 218). In the event monitoring system 150, the sparse weight vector has a dimensionality that corresponds to the number of basis vectors stored in the event dictionary data 138. Each entry in the sparse weight vector provides a relative weight value for the corresponding basis vector in the event dictionary with a value of zero in the sparse weight vector indicating that the corresponding basis vector is not used to generate the estimated feature vector. To generate the estimated feature vector, the priority identification module 158 uses the non-zero entries in the sparse weight vector to select basis vectors from the dictionary and weight the basis vectors to generate an estimated feature vector through a linear combination of the weights in the sparse vector and the selected basis vectors.

Figure 7:
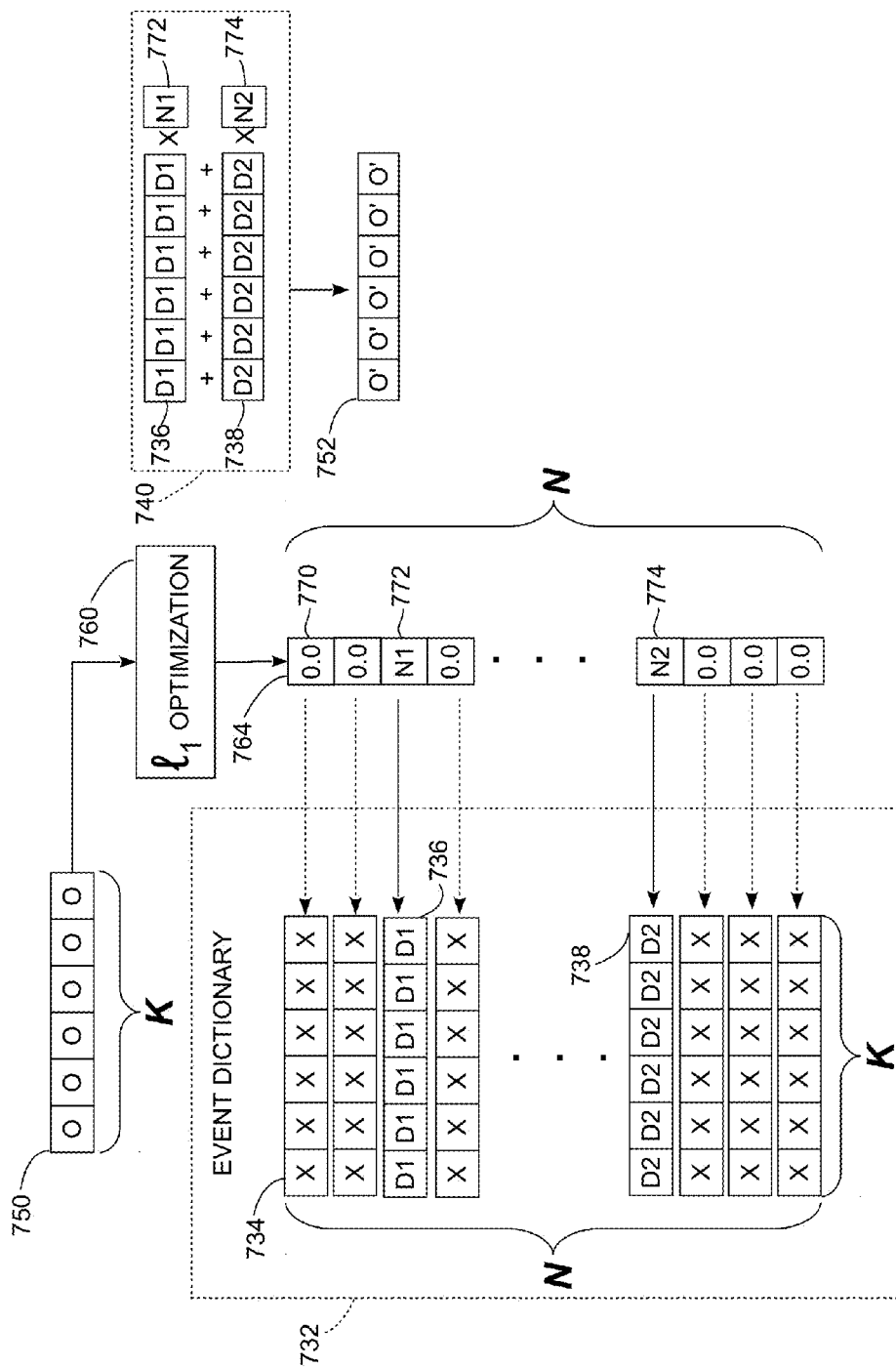
FIG. 7 is a simplified illustration of a metadata feature vector for metadata in an event that is identified in the video and sensor data in the system of FIG. 1, an event dictionary, and an estimated feature vector that is generated from basis vectors in the event dictionary.

FIG. 7 depicts a simplified example of an observed feature vector 750, an event dictionary 730, a sparse weight vector 764 that corresponds to the observed feature vector 750 and basis vectors in the event dictionary 732, and an estimated feature vector 752 that is generated from a linear combination of weighted basis vectors that are selected from the event dictionary 732. In FIG. 7, the observed feature vector 750 is a vector having dimensionality K, which is to say that the feature vector 750 includes K numeric elements with different values, which correspond to the observed metadata features O. The event dictionary 732 includes N basis vectors of the same dimensionality K as the observed feature vector 750. In the embodiment of FIG. 7, the value of N is greater than the value of K, which is to say that the event dictionary 732 includes a greater number of basis vectors than the dimensionality K of the basis vectors and the observed feature vector 750. The $l_1$ optimization process 760 described above generates the sparse weight vector 764 with dimensionality N where each element in the sparse vector 764 corresponds to one of the N basis vectors in the event dictionary 732. In the sparse weight vector 764, the majority of the elements have a numeric value of zero, such as the element 770. A value of zero in the sparse weight vector indicates that the corresponding basis vector, such as basis vector 734 in the event dictionary 732, has zero weight (i.e. is ignored) during generation of an estimate of the observed feature vector 750.

During process 200, the analysis system 130 generates the estimated feature vector that corresponds to the observed feature vector 750 from a linear combination of the entries in the sparse vector 764 and each of the corresponding basis vectors in the dictionary 732. Since most of the entries in the sparse vector 764 are zero, only a small number of the N basis vectors in the event dictionary 732 are used to generate the estimated feature vector. For example, the element 770 in the sparse vector 764 is zero, and the corresponding basis vector 734 in the event dictionary 732 is not used to generate the estimated feature vector. In FIG. 7, the dashed rectangle 740 depicts two basis vectors 736 and 738 from the event dictionary 732 that correspond to non-zero elements 772 and 774, respectively, in the sparse weight vector 764. The numeric values in the non-zero sparse vector entries weight the contribution of each of the basis vectors in the event dictionary 732 that are used to generate the estimated feature vector with a linear combination of the weighted basis vectors. For example, in the embodiment depicted in FIG. 7, the numeric weight value N1 of the element 772 is multiplied by each element D1 in the basis vector 736, and the numeric weight value N2 of the element 774 is multiplied by each element D2 in the basis vector 738. The corresponding elements in each of the weighted basis vectors are summed to generate the estimated feature vector 752. The estimated feature vector 752 is a vector with the same dimensionality K as the observed feature vector 750 with each element O' in the estimated feature vector 752 being an estimate of a corresponding element value O in the observed feature vector 750.

During process 200, the event monitoring system 150 identifies an error between the observed feature vector from the event feature extraction module and the estimated feature vector that is generated in the priority identification module 158 (block 220). In one embodiment, the error is identified as the sum of two terms: 1. Euclidean sum of the differences between the corresponding elements in the observed feature vector and the estimated feature vector, and 2. L1 norm (e.g. a sum of the absolute values of the non-zero entries) of the estimated sparse weight vector. For example, if the observed feature vector and estimated feature vector both have forty elements, then an error vector also includes forty elements, each of which includes the difference between the corresponding elements. The priority identification module 158 identifies the Euclidean sum of the elements in the error vector as a scalar error quantity. The identified error corresponds to the similarity or dissimilarity between the observed feature vector and the space of feature vectors that are represented in the event dictionary. A smaller error value indicates that the observed feature vector has a stronger similarity to the feature vectors that are represented by the dictionary, while a larger error value indicates a dissimilarity between the observed feature vector and the dictionary.

During process 200, the video monitoring system 100 prioritizes the event as either a high-interest event or a low-interest event with reference to a comparison between the identified error and a predetermined error threshold. If the identified error is below a predetermined threshold (block 224), then the priority identification module 158 identifies the event as a low-interest event (block 236). The event monitoring system 150 stores event metadata corresponding to the low-interest event in the event metadata database 136 in the data storage system 132. Even if an event is initially classified as a low-interest event, the monitoring system 100 retains the video and sensor data 134 and metadata 136 corresponding to the event for archival purposes and for further review by human operators. As described below, in some instances an event that is initially classified as being a low-interest event is later reclassified as a high-interest event.

If the identified error exceeds the predetermined threshold (block 224), then the priority identification module 158 identifies the event as a high-interest event (block 228). In the monitoring system 100, the event monitoring system 150 sends an alert signal to the mobile electronic device 116 and the monitoring terminal 120 to indicate the identification of the high-interest event (block 232). In one embodiment, the alert signal includes the corresponding video and sensor data 134 that depict the high-interest event. The alert signal can include additional information about the event and in some embodiments the analysis system 130 overlays additional information to highlight the high-interest event in the video data. Thus, in one operating mode the analysis system 130 limits the display of video data to the human operators to include only the high-interest events. Since human operators often become less effective at identifying high-interest events when reviewing prolonged video segments that predominantly include low-interest events, the analysis system 130 limits the display of the video to focus the attention of the human operators on high-interest events.

During operation, the video monitoring system 100 performs process 200 to classify each event identified in the video and sensor data as a low-interest or high-interest event. In one embodiment the event monitoring system 150 includes parallel processing hardware and software components that classify multiple events concurrently. The event monitoring system 150 directs alerts to one or more human operators to review the video for the high-interest events.

Figure 3:
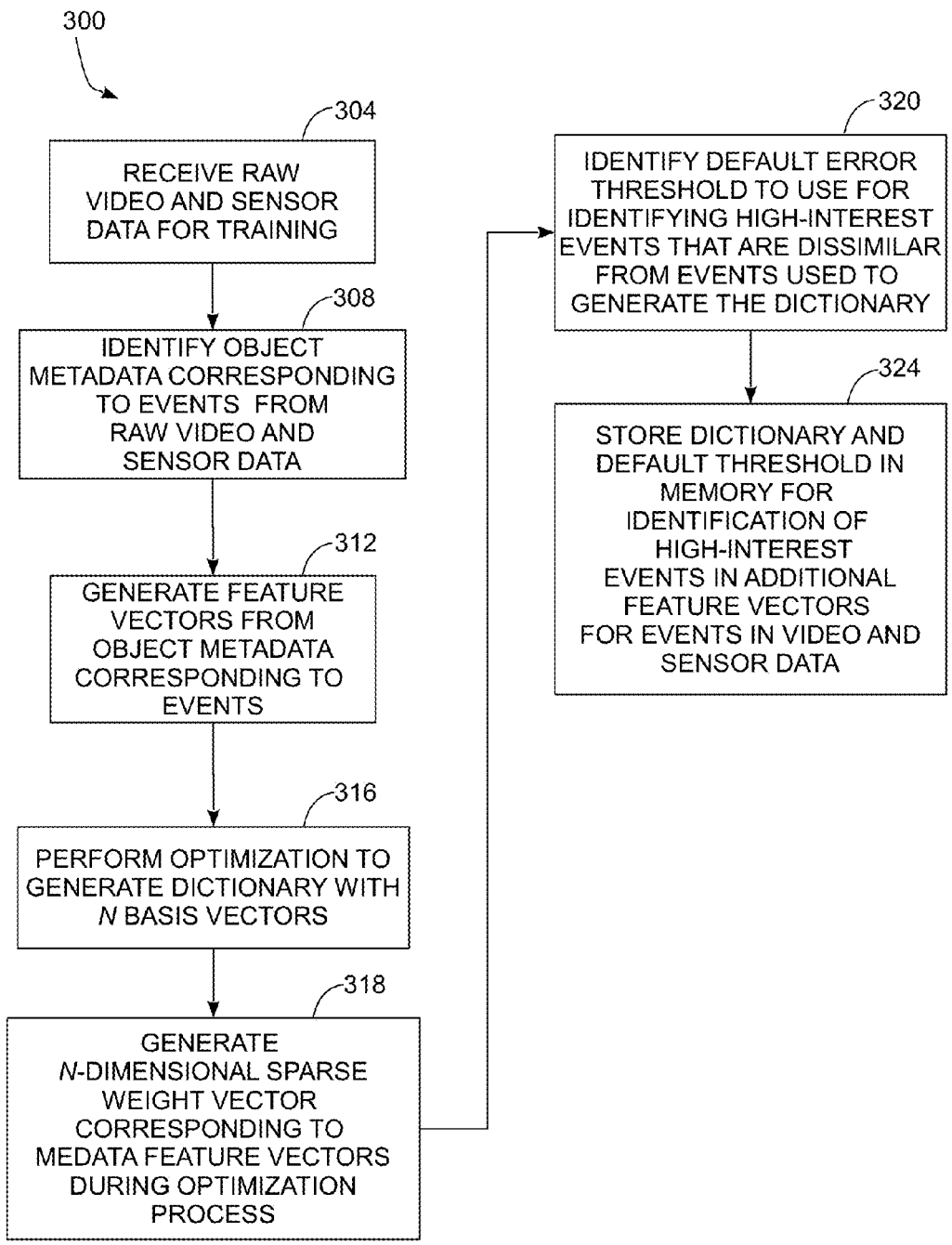
FIG. 3 is a block diagram of a sparse encoding process for generating an event dictionary from training data in a video monitoring system.

As described above, during process 200 the video analysis system 130 identifies whether events recorded in video and sensor data are high-interest events or low-interest events based on the event dictionary 138. FIG. 3 depicts a process 300 for generating the event dictionary from video and sensor data. In the description below, a reference to the process 300 performing or doing some function or action refers to one or more controllers or processors that are configured with programmed instructions to implement the process performing the function or action or operating one or more components to perform the function or action. Process 300 is described with reference to the video monitoring system 100 of FIG. 1 for illustrative purposes.

To generate the event dictionary, the analysis system 130 receives a set of video and sensor training data (block 304). The video and sensor data typically includes video recordings and associated sensor data corresponding to expected activity that the video monitoring system 100 observes during operation. For example, a video monitoring system that monitors an entrance of a building receives training data taken over a period of several hours or several days of typical activity. While the process 300 does not require human intervention, a human operator optionally confirms that the training video and sensor data predominantly comprise low-interest events that do not require further human analysis. For example, the video data of the building entrance depict regular activities of people entering and exiting the building instead of depicting fire drills or other high-interest events. The training data can include some high-interest events, but the high-interest events should be much less frequent than low-interest events.

During process 300, the analysis system 130 identifies a plurality of events in the video and sensor training data and identifies metadata corresponding to the objects in the events (block 308). In the event monitoring system 150, the VCA and metadata generation module 152 identifies the metadata for objects in each of the events in the same manner as described with reference to the processing of block 208 in the process 200. During process 300, the event feature extraction module 154 generates a plurality of feature vectors (block 312). The event feature extraction module 154 generates each feature vector in the same manner as described above with reference to the processing of block 212 in the process 200.

After forming the plurality of feature vectors that are formed from the metadata of observed events in the training video and sensor data, the analysis system 130 performs a penalized optimization process to generate a dictionary of basis vectors that are used to describe the feature vectors in the training data (block 316). In the video monitoring system 100, the autonomous training module 156 receives the feature vectors from the event feature extraction module 154 and generates the event dictionary. The generated dictionary includes a plurality of N basis vectors, each of which has the same dimensionality K as the fixed-dimensionality feature vectors. The number of basis vectors to generate is selected based on the desired complexity of the dictionary. In general, the accuracy of feature vector identification increases as the number of basis vectors increases, but the computational complexity and corresponding training time also increase as the number of basis vectors increase. In one embodiment, the number of basis vectors is selected to be "overcomplete," which is to say that the number of basis vectors exceeds the dimensionality of the feature vectors. As is known in the art, overcomplete dictionaries provide tolerance to noise that may be present in the entries of individual feature vectors.

During process 300, the training module 156 identifies a sparse weight vector that corresponds to each feature vector in the training data as part of the penalized optimization process (block 318). For example, the autonomous training module 156 performs the $l_1$ optimization process on the plurality of feature vectors to generate the basis vectors in the event dictionary and corresponding sparse weight vectors for each one of the metadata feature vectors in the training data. The $l_1$ optimization process is performed in an iterative manner in which the basis vectors are initialized with random data and the optimization process optimizes the sparse weight vectors given the feature vectors. Next, the $l_1$ process optimizes the basis vectors given the sparse weight vectors and the given feature vectors. The $l_1$ optimization process continues in an iterative manner until the basis vectors in the dictionary and the sparse weight vectors corresponding to the training data feature vectors converge to stable values that form the event dictionary for the given set of training feature vectors. The $l_1$ optimization process includes operations that ensure that the sparse weight vectors are primarily composed of zero entry elements with a small number of non-zero weight terms. The generation of event dictionaries using a $l_1$ optimization process or another penalized optimization process for pixel inputs from one or more images is generally known to the art. In the process 300, however, the event dictionary is generated from feature vectors that correspond to metadata about events in the video data instead of feature vectors that correspond to pixels that are included in one or more frames of the video data.

Figure 8:
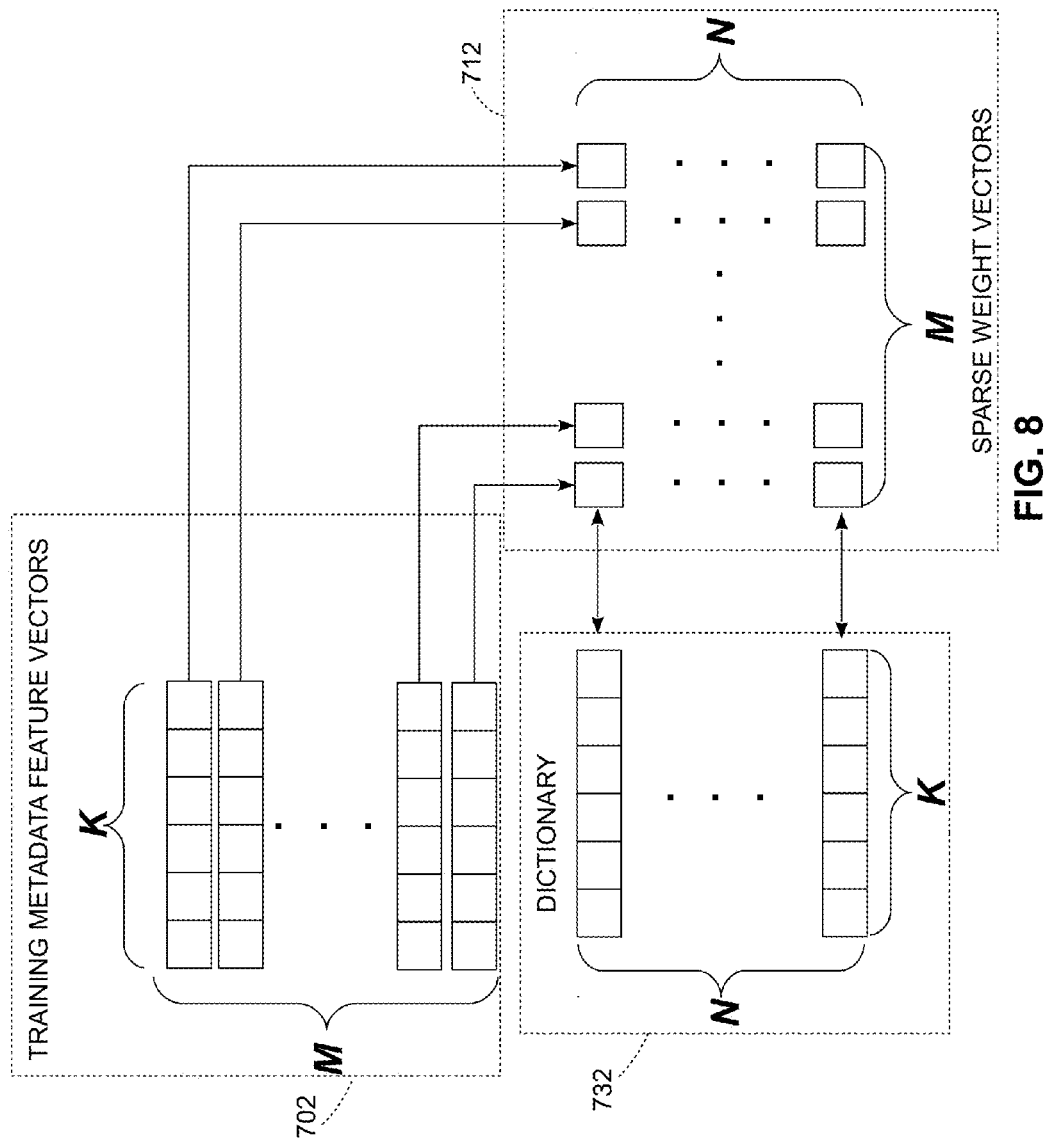
FIG. 8 is a simplified illustration of training data feature vectors and corresponding sparse weight vectors that are used to generate the basis vectors in the event dictionary in the system of FIG. 1.

FIG. 8 depicts an illustrative example of training data and a corresponding dictionary. FIG. 8 depicts a plurality of M training vectors 702, where each training vector has a dimensionality K. Each of the training vectors 702 is a unit normalized feature vector of metadata elements that are extracted from predetermined video and sensor metadata. In FIG. 8, an event dictionary 732 includes a plurality of N basis vectors, where each basis vector has the same dimensionality K as the feature vectors in the training data 702. As described above, in some embodiments the number of N basis vectors is a predetermined number that is larger than the dimensionality number K for each feature vector to form an overcomplete event dictionary. While not required, in many embodiments the number of feature vectors M in the training data 702 exceeds the number of basis vectors N in the event dictionary 732. The $l_1$ optimization process generates the elements in the N basis vectors in the dictionary 732 from the training feature vectors 702 as described above. In the video monitoring system 100, the data storage system 132 stores event dictionary data 138 including the basis vectors depicted in the event dictionary 732.

In FIG. 8, the $l_1$ optimization process that is described above also generates a plurality of M sparse weight vectors 712, with each sparse weight vector corresponding to one of the feature vectors 702 in the training data. Each of the sparse vectors 712 has a dimensionality N, where each of the N elements in each of the sparse vectors 712 corresponds to one of the N basis vectors in the event dictionary 732. As described above, a linear combination of the basis vectors that correspond to the non-zero elements in each of the sparse weight vectors 716 generates an estimated feature vector that corresponds to the original training feature vector in the training data 702.

In the analysis system 130, the sparse vectors 712 that correspond to the training feature vectors 702 are not required for use in identifying high-interest and low-interest events in video and sensor data after the dictionary 732 is generated. In one embodiment of the video monitoring system 100, however, the data storage system 132 stores the sparse vectors 712 that are generated during the training process as training data 142. As described below, the video monitoring system 100 uses sparse vectors that correspond to training data and to other observed metadata feature vectors in video and sensor data to search for similar events in the video and sensor data, and to enable operator feedback to add or remove basis vectors from the event dictionary to reduce errors in identifying high-interest and low-interest events.

Referring again to FIG. 3, after generation of the event dictionary, the training module 156 optionally identifies the default error threshold that is used to classify high-interest and low-interest events in the video and sensor data (block 320). In one embodiment, the training module 156 identifies the range of errors in the estimated feature vectors that are generated from the event dictionary when applied to the metadata feature vectors in the training data. The error threshold is set as a predetermined percentage, such as 99% or 99.9%, of the maximum error that is observed in the training data. In different configurations, the error threshold value is increased to reduce the frequency of identification of high-interest events in the observed metadata feature vectors, and decreased to increase the frequency of identification of high-interest events in the observed metadata feature vectors.

After generating the event dictionary and error threshold, the training module 156 stores the event dictionary data and predetermined error threshold in the event dictionary 138 of the data storage system 132 (block 324). The event dictionary data 138 is stored for later retrieval and use in identifying whether additional events in the video and sensor data are high-interest events or low-interest events. In the embodiment of the process 300 described above, the system 100 generates the basis dictionary in batch mode using a large set of predetermined training data. In another embodiment, the process 300 is performed in an online mode using observed metadata feature vectors that the system 100 extracts from individual events in the video and sensor data. The analysis system 130 updates the basis vectors in the event dictionary 138 as new events are observed. In still another embodiment, the system 100 generates the event dictionary 138 using the predetermined training data 142 in batch mode, and then continually updates the event dictionary in an online mode with reference to newly observed metadata feature vectors that are extracted from the video and sensor data 134 during operation of the system 100. As described below, while the process 300 generates the event dictionary in an autonomous manner, the video monitoring system 100 employs human feedback to adjust the contents of the event dictionary to increase the accuracy of high-interest event detection.

During operation, the video monitoring system 100 identifies high-interest events and low-interest events as described above with reference to FIG. 2 using the event dictionary that is generated as described above with reference to FIG. 3. When a high-interest event is identified, the event monitoring system 100 alerts a human operator and the human operator reviews the video data using the mobile electronic device 116 or monitoring terminal 120. Some events that the analysis system 130 classifies as high-interest are not, in fact, high-interest events. A "false-positive" identification occurs when the analysis system 130 incorrectly identifies a low-interest event as a high-interest event.

Figures 4A, 4B:
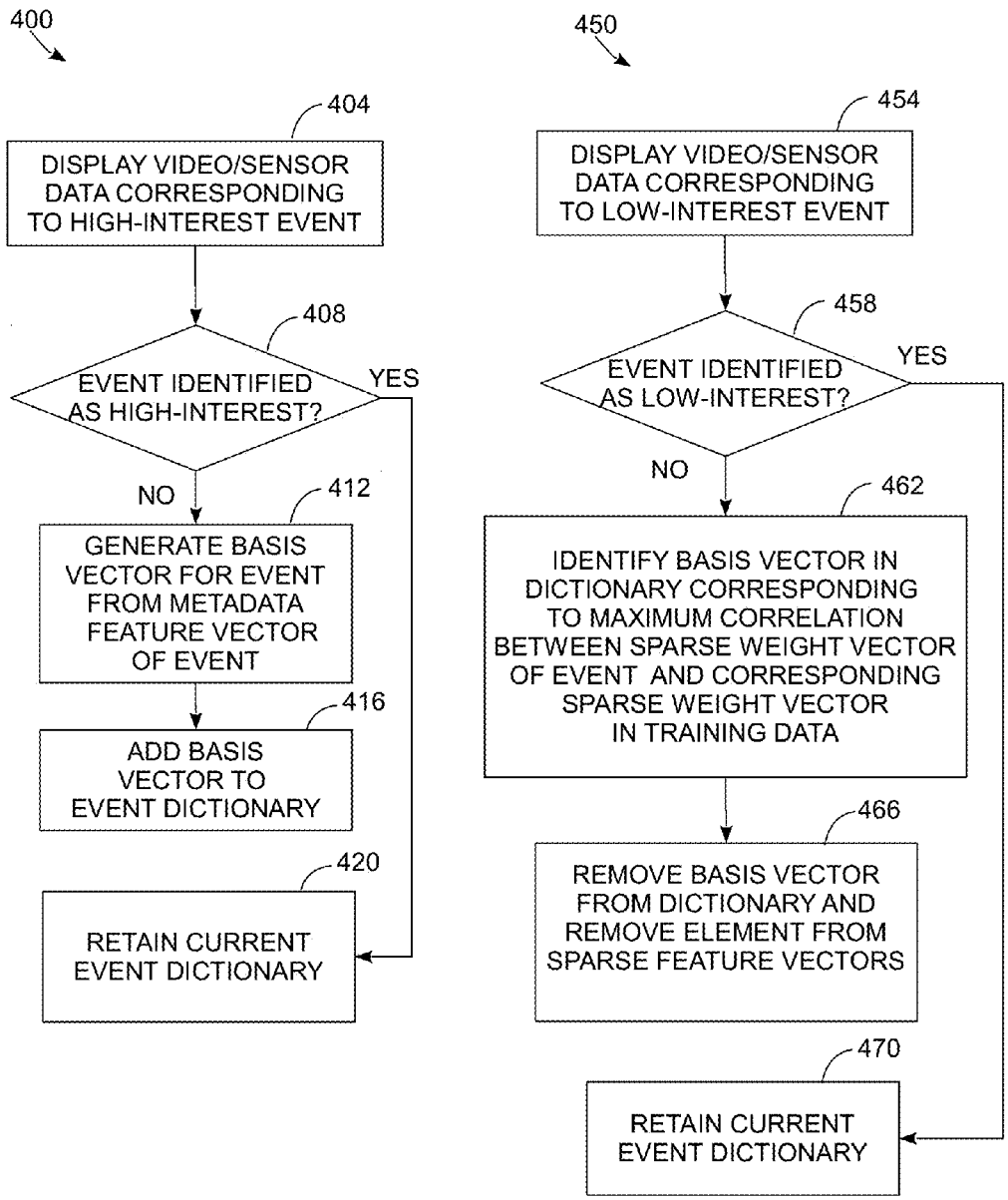
FIG. 4A is a block diagram of a process for modifying a dictionary containing encoded data corresponding to observed low-interest events to include data corresponding to another low-interest event.
FIG. 4B is a block diagram of a process for modifying a dictionary containing encoded data corresponding to observed low-interest events to remove a high-interest event from the dictionary.

FIG. 4A depicts a process 400 that enables the human operator to provide feedback to the analysis system 130 to add an additional basis vector to the event dictionary data 138 that reduces the occurrence of false-positive errors. In the description below, a reference to the process 400 performing or doing some function or action refers to one or more controllers or processors that are configured with programmed instructions to implement the process performing the function or action or operating one or more components to perform the function or action. Process 400 is described with reference to the video monitoring system 100 of FIG. 1 for illustrative purposes.

Process 400 begins after the analysis system 130 identifies a high-interest event in the video data and the human operator reviews the video and sensor data corresponding to the event (block 404). In the event monitoring system 150, the video playback and dictionary update module 160 retrieves and sends selected portions of the video and sensor data 134 to the mobile electronic device 116 and monitoring terminal 120 for human review. If the human operator determines that the event depicted in the video is a high interest event (block 408), then the human operator takes an appropriate action and the analysis system 130 retains the current event dictionary (block 420).

In some circumstances, however, the analysis system 130 identifies a high-interest event that the human operator determines not to be a high-interest event (block 408). The human operator enters an input through a GUI or other user interface in the mobile electronic device 116 or monitoring terminal 120 to indicate that the identified event is not a high-interest event. As described above with reference to the process 300, the event dictionary is generated from a large number of events in training data. As described above with reference to the process 200, a high-interest event corresponds to an event with a metadata feature vector that has comparatively large error in relation to an estimated feature vector that is generated from the basis vectors in the dictionary and the sparse weight vector corresponding to the newly identified event that is generated using the $l_1$ optimization process.

During process 400, the analysis system 130 generates a new basis vector corresponding to the feature vector of the false-positive event in response to the human operator determining that the event is not a high-interest event (block 412). In the analysis system 130, the video playback and dictionary update module 160 has access to the feature vector for the false-positive high-interest event $(X_t)$, the estimated feature vector that the priority identification module 158 generates during process 200 $(\hat{X}_t)$, and to the event dictionary data 138. The video playback and dictionary update module 160 generates a new basis vector by first setting a majority of the elements in the sparse weight vector, corresponding to the estimated feature vector $\hat{X}_t$, to zero to generate a new estimated feature vector $\hat{X}'_t$. The new estimated vector $\hat{X}'_t$ is generated using a small number of non-zero elements from the sparse weight vector having the largest values, and the elements with smaller values are set to zero since the smaller values typically represent noise. Next, the video playback and dictionary update module 160 subtracts the new estimated feature vector from the observed feature vector of the false-positive event to generate the basis vector B: $B=X_t-\hat{X}'_t$.

After generating the basis vector B, the video playback and dictionary update module 160 adds the basis vector B to the event dictionary data 138 (block 416). The updated event dictionary 134 now includes a basis vector that corresponds to the false-positive event, and to other events with similar metadata feature vectors. In the analysis system 130, the sparse weight vectors that are stored in association with the training data 142 are updated to include an additional zero-valued entry for the new basis vector. As the analysis system 130 identifies the level of interest for additional metadata feature vectors, the penalized optimization process generates sparse vectors with a dimensionality that corresponds to the new number of basis vectors in the event dictionary. As the video monitoring system records additional events in the video and sensor data, the analysis system 130 classifies new events that are similar to the false-positive event as being low-interest events instead of high-interest events.

In addition to false-positive errors, the video monitoring system 100 may occasionally classify an event in the video and sensor data as a low-interest event when the event is actually a high-interest event. A failure to identify a high-interest event is referred to as a "false-negative" identification error, or a missed detection.

FIG. 4B depicts a process 450 that enables the human operator to provide feedback to the analysis system 130 to remove one or more basis vectors from the event dictionary data 138 that reduces the occurrence of false-negative errors. In the description below, a reference to the process 450 performing or doing some function or action refers to one or more controllers or processors that are configured with programmed instructions to implement the process performing the function or action or operating one or more components to perform the function or action. Process 450 is described with reference to the video monitoring system 100 of FIG. 1 for illustrative purposes.

Process 450 begins when the video monitoring system 100 presents video and sensor data of low-interest events to human operators (block 454). As described above with reference to the process 200, the analysis system 130 typically sends video data corresponding to high-interest events to the mobile electronic device 116 or monitoring terminal 120. In another operating mode, however, the video playback and dictionary update module 160 selects portions of the video and sensor data 134 for review by the human operators. In one configuration the selected video and sensor data include randomly selected low-interest events. The human operators review short segments of video that typically last a few seconds or a few minutes to prevent the human operators from losing focus on the events that are depicted in the video data. If the human operator confirms that each of the events in the video and sensor data are low-interest events (block 458), then the analysis system 130 retains the current event dictionary data 138 to identify high-priority and low-priority events in the video and sensor data (block 470).

In some circumstances, the human operator determines that a low-interest event is actually a high-interest event that has been classified incorrectly (block 458). In the video monitoring system 100, the human operator provides an input through a GUI or other input interface in the mobile electronic device 116 or monitoring terminal 120 to specify that a previously identified low-interest event should be classified as a high-interest event. The false-negative identification typically occurs when the training data that are used to generate the event dictionary include one or more events that are similar to the false-negative event. Since the feature vector of the metadata for the false-negative event can be estimated from the basis vectors in the dictionary with a comparatively small error, the analysis system 130 incorrectly classifies the event as a low-interest event.

In response to receiving a signal indicating that a low-interest event is in fact a high-interest event, the video playback and dictionary update module 160 identifies one or more basis vectors in the event dictionary data 138 that correspond to the feature vector of the identified event (block 462). To identify the basis vectors that correspond to the feature vector for the false-negative event, the video playback and dictionary update module 160 first identifies a feature vector $X_s$ from the metadata of an event in the original training data that is most similar to the feature vector $X_t$ of the identified false-negative event. In one embodiment, the video playback and dictionary update module 160 identifies the feature vector $X_s$ through a correlation of the sparse weight vector that is generated from the feature vector $X_t$ using the penalized optimization process with the event dictionary 138, and the sparse weight vectors for the training feature vectors that are stored with the training data 142 in the data storage system 132. The video playback and dictionary update module 160 generates the sparse weight vectors $\hat{X}_t$ and $\hat{X}_s$ corresponding to the observed feature vectors $X_t$ and $X_s$, respectively, using the penalized optimization process, such as the $l_1$ optimization process that is described above with reference to the processing of block 216 in FIG. 2. The video playback and dictionary update module 160 next finds the element by element correlation $(\hat{X}_t \cdot \hat{X}_s)$ between the sparse weight vectors. The correlation is another vector with the same dimension as the sparse weight vectors $\hat{X}_t$ and $\hat{X}_s$. Since the sparse weight vectors each have a dimensionality that corresponds to the number of basis vectors in the event dictionary, each element in the correlation vector also corresponds to one of the basis vectors in the event dictionary. For example, as depicted in FIG. 8, the correlation vector has the dimensionality N of the sparse weight vectors 712 and each element of the correlation vector corresponds to one of the N basis vectors in the event dictionary 732. In the correlation vector, the element at index I with the maximum value of all the elements in the correlation vector corresponds to a basis vector $B_I$ in the N basis vectors in the event dictionary.

After identifying the basis vector $B_I$ that corresponds to the maximum valued element at index I in the correlation vector, the video playback and dictionary update module 160 deletes the identified feature vector $B_I$ from the event dictionary 138 (block 466). Once the basis vector $B_I$ is deleted from the event dictionary, the dictionary generates the estimated feature vector for a subsequent event with a metadata feature vector that is similar to the false-negative event without the benefit of the deleted basis vector $B_I$. Without the basis vector $B_I$, the estimated feature vector has a greater error, which increases the likelihood that the event monitoring system 150 identifies the new event as a high-interest event instead of a low-interest event. In addition to deleting the basis vector from the dictionary, the analysis system 130 also deletes corresponding entries from the sparse weight vectors stored in the training data 142, and the penalized optimization process for subsequent event feature vectors generates sparse weight vectors with a dimensionality that corresponds to the new number of basis vectors in the dictionary 138. While the process 450 describes deletion of a single basis vector from the event dictionary, an alternative embodiment identifies the feature vectors of two or more events in the training data with a strong correlation to the feature vector of the false-negative event, and the video playback and dictionary update module 160 deletes two or more basis vectors from the event dictionary 138.

The processes 400 and 450 enable human operators to improve the accuracy of detection in the video monitoring system 100. While the baseline training to generate the event dictionary 138 is performed in an autonomous manner, the event monitoring system 100 still enables human feedback to reduce the occurrence of false-positive and false-negative classifications for different events in the video data. Thus, the video monitoring system 100 trains the event dictionary to identify high-interest events and low-interest events without requiring extensive human input that consumes a great deal of time and is subject to human error. However, the video monitoring system 100 enables the human operators to improve the accuracy of event classification in selected circumstances where a focused human operator can classify specific events with greater accuracy than an automated event classification process.

Figure 5:
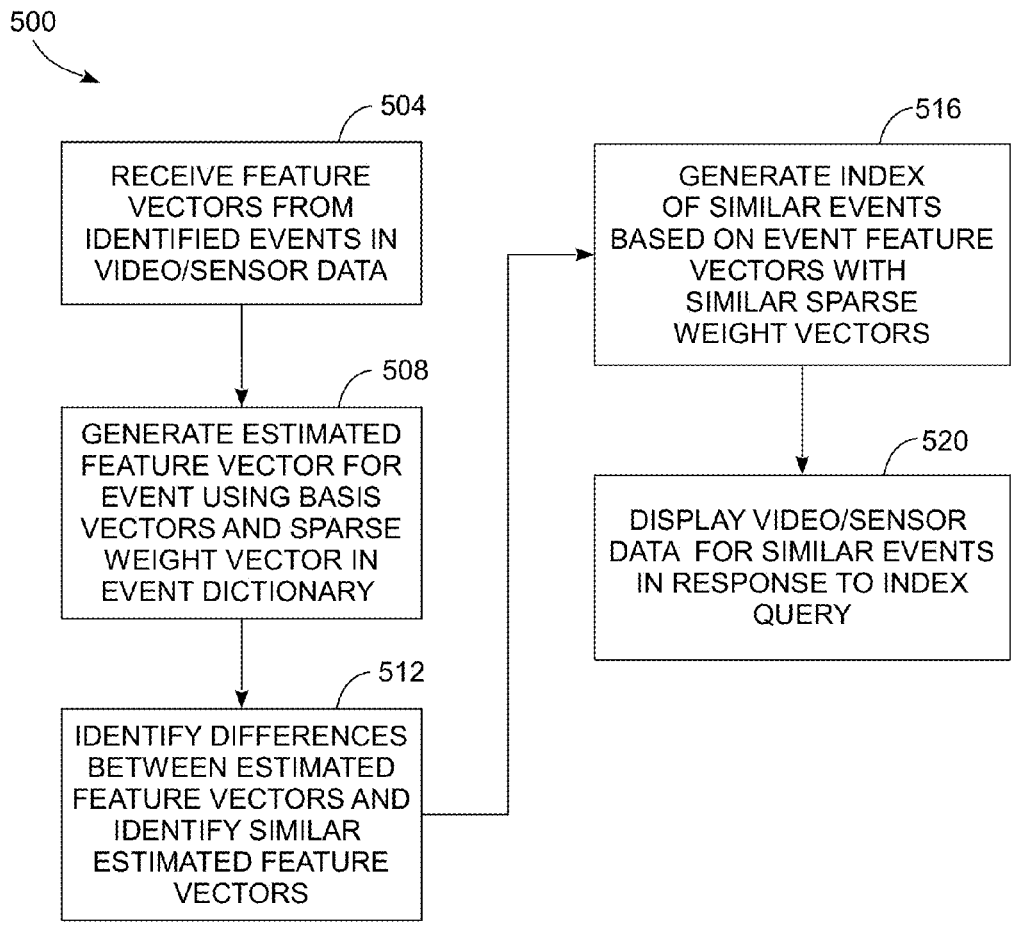
FIG. 5 is a block diagram of a process for generating an index of similar events that are recorded in a video monitoring system to enable efficient searching of similar events.

During operation of the video monitoring system, human operators often review video and sensor data of similar events. For example, an operator of a traffic monitoring system searches for recent events where a vehicle travels in the opposite direction of prevailing traffic on a road. In traditional video monitoring systems, searching for similar events often requires manual playback of long video segments. The manual search is time consuming and the human operators can overlook related events during a manual review. FIG. 5 depicts an indexing process 500 that enables the video monitoring system 100 to identify similar events in the recorded video and sensor data to enable efficient retrieval of video segments that correspond to similar events. In the description below, a reference to the process 500 performing or doing some function or action refers to one or more controllers or processors that are configured with programmed instructions to implement the process performing the function or action or operating one or more components to perform the function or action. Process 500 is described with reference to the video monitoring system 100 of FIG. 1 for illustrative purposes.

In process 500 an indexing process receives the feature vectors that are generated from the metadata corresponding to a large number of events in the video and sensor data (block 504). In the analysis system 130, the event indexing module 162 is configured to receive the metadata feature vectors that are generated in the event feature extraction module 154. Additionally, the event indexing module accesses event metadata and feature vectors 136 that are stored in association with identified events in the archived video and sensor data 134 in the data storage system 132. The event indexing module 162 generates an event search index 140 that associates similar events using the feature vectors of the events as input data. In one embodiment, the event indexing module 162 updates the event search index 140 as the analysis system 130 identifies new events in the video and sensor data. In another embodiment, the event search index 140 stores index numbers that correspond to a small number of the largest non-zero values in the sparse weight vectors that correspond to each of the indexed feature vectors. Feature vectors of observed events that include some or all of the same sparse weight indices are considered to be similar in the alternative embodiment. For example, if the penalized optimization process generates sparse weight vectors for two observed feature vectors that include the largest weight values at indices A, B, and C, then the reconstructed estimated feature vectors for both of the observed feature vectors include the basis vectors corresponding to the indices A, B, and C. The resulting estimated feature vectors for both of the observed feature vectors are therefore similar and the search index associates both of the observed feature vectors with each other based on the similar sparse weight vector values.

Referring again to FIG. 5, the process 500 continues with generation of estimated feature vectors that correspond to the identified feature vectors of events in the video and sensor data (block 508). In the analysis system 130, the estimated feature vectors are generated using the event dictionary 138 in the same manner as described above with reference to the processing of block 216 in FIG. 2. In one embodiment, the feature vector data 136 in the data storage system 132 includes the sparse weight vector in association with each observed feature vector for each event so that the event monitoring system 150 only needs to generate the estimated feature vector once for each event.

Process 500 continues as the event indexing module 162 identifies the differences between the estimated feature vectors that correspond to each of the identified events to find similar estimated feature vectors (block 512). The event indexing module 162 identifies the differences between the estimated feature vectors to identify groups of similar estimated feature vectors that have small differences and to distinguish between dissimilar estimated feature vectors that have large differences. In one embodiment, the event indexing module 162 employs a clustering process to group similar events into clusters. In one embodiment, the event indexing module 162 identifies a cluster of previously identified estimated feature vectors that have the greatest similarity to an estimated feature vector of a newly identified event. The event indexing module 162 updates the clustered information as new events are identified.

Process 500 continues with generation of an index of similar events based on the identified groups of similar sparse weight vectors (block 516). In the data storage system 132, the event search index 140 includes a unique identifier for each event that is identified in the video and sensor data 134. The event search index associates each event with other events that have similar estimated feature vectors. Once the event indexing module 162 identifies the similar events, the event search index is generated using, for example, a database indexing service that is provided by a commercially available database management system.

Once process 500 generates and updates the event search index, the analysis system 130 retrieves video and sensor data for similar events in response to a query received from the mobile electronic device 116 or monitoring terminal 120 (block 520). For example, a human operator reviews video footage using the monitoring terminal 120 and inputs a query using a GUI to request instances of video footage of similar events for further review. The analysis system 130 receives the request and identifies similar events in the event search index 140. The analysis system 130 retrieves video and sensor data 134 corresponding to the similar events for review through the monitoring terminal 120. In some embodiments, the request specifies that the video segments of similar events should be arranged in a chronological order or based on the degree of similarity identified between the estimated feature vectors of the different events.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for monitoring video data comprising:
   identifying a feature vector of an event having data corresponding to at least one of a position and a direction of movement of an object in video data;
   generating an estimated feature vector corresponding to the feature vector using a dictionary that includes a plurality of basis vectors, the generating of the estimated feature vector further comprising:
     performing a penalized optimization process with the identified feature vector and the plurality of basis vectors in the dictionary to generate a sparse weight vector that corresponds to the identified feature vector, the sparse weight vector including a plurality of elements with each element corresponding to a basis vector in the dictionary; and
     generating the estimated feature vector from a weighted sum of a plurality of basis vectors in the dictionary that correspond to elements in the sparse weight vector with non-zero weight values;
   identifying an error between the estimated feature vector and the identified feature vector;
   identifying a high-interest event in the video data in response to the identified error exceeding a threshold;
   displaying the video data that includes the high-interest event on a video output device only in response to the identified error exceeding the threshold;
   receiving a first signal from the video output device indicating the displayed video data do not include a high-interest event; and updating the dictionary in response to receiving the first signal, the updating further comprising:
  generating a modified sparse weight vector based on the sparse weight vector to set any values that are less than a predetermined threshold from the sparse weight vector to zero;
  generating another estimated feature vector from another weighted sum of the plurality of basis vectors in the dictionary that correspond to elements in the modified sparse weight vector with non-zero weight values; and
  generating an additional basis vector based on a difference between the feature vector of the event and the other estimated feature vector; and
  storing the additional basis vector in the dictionary.

2. The method of claim 1, the feature vector further comprising:
data corresponding to a velocity of movement of the object in the video data.

3. The method of claim 1, the feature vector further comprising:
data corresponding to a size of the object in the video data.

4. The method of claim 1, the feature vector further comprising:
data corresponding to a length of time that the object is present in the video data.

5. The method of claim 1 further comprising:
identifying a low-interest event in the video data in response to the identified error being below the threshold;
displaying the video data that includes the low-interest event;
receiving a signal indicating the low-interest event in the displayed video data is a high-interest event; and
updating the dictionary in response to receiving the signal.

6. The method of claim 5, the updating of the dictionary further comprising:
identifying a basis function in the dictionary that corresponds to the feature vector for the object; and
removing the identified basis function from the dictionary.

7. The method of claim 1, the data in the feature vector corresponding to the position of the object further comprising:
a histogram corresponding to two-dimensional position coordinates of the object in the video data.

8. The method of claim 1, the data in the feature vector corresponding to the direction of movement of the object further comprising:
a histogram corresponding to the direction of movement of the object in the video data.

9. The method of claim 1 further comprising:
receiving a plurality of training feature vectors that correspond to at least one of a position and a direction of movement of each of a plurality of objects in training video data;
generating a plurality of training basis vectors including randomized entries and a plurality of sparse weight vectors including randomized entries, each weight vector in the plurality of sparse weight vectors corresponding to one basis vector in the plurality of basis vectors; and
performing an optimization process with the plurality of training feature vectors, the plurality of training basis vectors, and the plurality of sparse weight vectors to generate the plurality of basis vectors in the dictionary, the plurality of basis vectors in the dictionary and each one of the sparse weight vectors being configured to generate an estimated feature vector corresponding to one of the plurality of training feature vectors with less than a predetermined maximum error.

10. The method of claim 9 wherein the optimization process is a penalized optimization process.

11. The method of claim 9 further comprising:
generating a plurality of estimated feature vectors from the plurality of basis vectors in the dictionary and the plurality of sparse weight vectors, each estimated feature vector corresponding to one of the training vectors in the plurality of training vectors;
identifying a plurality of errors between each estimated feature vector in the plurality of estimated feature vectors and a corresponding training feature vector in the plurality of training feature vectors; and
identifying the threshold for identification of a high-interest event with reference to a maximum error in the plurality of errors.

12. The method of claim 1 further comprising:
identifying a plurality of feature vectors corresponding to a plurality of events comprising data corresponding to at least one of a position and a direction of movement of a plurality of objects in video data;
generating a plurality of estimated feature vectors corresponding to the plurality of feature vectors using the dictionary;
identifying a plurality of groups in the plurality of estimated feature vectors, each group including a plurality of feature vectors with at least a predetermined level of similarity; and
generating an index including a plurality of events corresponding to one of the identified groups of estimated feature vectors, the index associating each event in the plurality of events with corresponding video data for display of video data corresponding to the plurality of events on the video output device.

13. A video monitoring system comprising:
a camera configured to generate video data of events, each event including an object in the video data;
a video output device configured to display portions of the video data generated by the camera; and
a processor operatively connected to the camera, the video output device, and a memory, the processor being configured to:
  identify a feature vector of an event comprising data corresponding to at least one of a position and a direction of movement of an object in video data received from the camera;
  generate an estimated feature vector corresponding to the feature vector using a dictionary stored in the memory that includes a plurality of basis vectors, the processor being further configured to:
    perform a penalized optimization process with the identified feature vector and the plurality of basis vectors in the dictionary to generate a sparse weight vector that corresponds to the identified feature vector, the sparse weight vector including a plurality of elements with each element corresponding to a basis vector in the dictionary; and
    generate the estimated feature vector from a weighted sum of a plurality of basis vectors in the dictionary that correspond to elements in the sparse weight vector with non-zero weight values;
  identify an error between the estimated feature vector and the feature vector;

identify a high-interest event in the video data in response to the identified error exceeding a threshold;
display the video data that includes the high-interest event on the video output device only in response to the identified error exceeding the threshold;
receive a first signal from the video output device indicating the displayed video data do not include a high-interest event; and
update the dictionary in response to receiving the first signal, the processor being further configured to:
generate a modified sparse weight vector based on the sparse weight vector to set any values that are less than a predetermined threshold from the sparse weight vector to zero;
generate another estimated feature vector from another weighted sum of the plurality of basis vectors in the dictionary that correspond to elements in the modified sparse weight vector with non-zero weight values; and
generate an additional basis vector based on a difference between the feature vector of the event and the other estimated feature vector; and
store the additional basis vector in the dictionary in the memory.

14. The video monitoring system of claim 13, the processor being further configured to:
identify the feature vector of the event with data corresponding to a velocity of movement of the object in the video data.

15. The video monitoring system of claim 13, the processor being further configured to:
identify the feature vector of the event with data corresponding to a size of the object in the video data.

16. The video monitoring system of claim 13, the processor being further configured to:
identify the feature vector of the event with data corresponding to a length of time that the object is present in the video data.

17. The video monitoring system of claim 13, the processor being further configured to:
identify a low-interest event in the video data in response to the identified error being below the threshold;
display the video data that includes the low-interest event;
receive a signal indicating the low-interest event in the displayed video data is a high-interest event; and
update the dictionary in response to receiving the signal.

18. The video monitoring system of claim 17, the processor being further configured to:
identify a basis function in the dictionary that corresponds to the feature vector for the object; and
remove the identified basis function from the dictionary in the memory.

19. The video monitoring system of claim 13, the processor being further configured to:
generate a histogram corresponding to two-dimensional position coordinates of the object in the video data; and
generate the feature vector with reference to the histogram corresponding to the two-dimensional position coordinates of the object in the video data.

20. The video monitoring system of claim 13, the processor being further configured to:
generate a histogram corresponding to the direction of movement of the object in the video data;
generate the feature vector with reference to the histogram corresponding to the direction of movement of the object in the video data.

21. The video monitoring system of claim 13, the processor being further configured to:
generate a plurality of training feature vectors that correspond to at least one of a position and a direction of movement of each object in a plurality of objects in training video data that are stored in the memory;
generate a plurality of training basis vectors including randomized entries and a plurality of sparse weight vectors including randomized entries, each weight vector in the plurality of sparse weight vectors corresponding to one basis vector in the plurality of basis vectors;
perform an optimization process with the plurality of training feature vectors, the plurality of training basis vectors, and the plurality of sparse weight vectors to generate the plurality of basis vectors in the dictionary, the plurality of basis vectors in the dictionary and each one of the sparse weight vectors being configured to generate an estimated feature vector corresponding to one of the plurality of training feature vectors with less than a predetermined maximum error; and
store the plurality of basis vectors for the dictionary in the memory.

22. The video monitoring system of claim 21 wherein the processor performs a penalized optimization process to generate the plurality of basis vectors for the dictionary.

23. The video monitoring system of claim 21, the processor being further configured to:
generate a plurality of estimated feature vectors from the plurality of basis vectors in the dictionary and the plurality of sparse weight vectors, each estimated feature vector corresponding to one training vector in the plurality of training vectors;
identify a plurality of errors between each estimated feature vector in the plurality of estimated feature vectors and a corresponding training feature vector in the plurality of training feature vectors;
identify the threshold with reference to maximum error in the plurality of errors; and
store the identified threshold in the memory for identification of high-interest events.

24. The video monitoring system of claim 13, the processor being further configured to:
identify a plurality of feature vectors corresponding to a plurality of events having data corresponding to at least one of a position and a direction of movement of a plurality of objects in video data;
generate a plurality of estimated feature vectors corresponding to the plurality of feature vectors using the dictionary;
identify a plurality of groups in the plurality of estimated feature vectors, each group including a plurality of feature vectors with at least a predetermined level of similarity; and
generate an index including a plurality of events corresponding to one of the identified groups of estimated feature vectors, the index associating each event in the plurality of events with corresponding video data for display of video data corresponding to the plurality of events on the video output device.

* * * * *